(12) United States Patent
Masakowski et al.

(10) Patent No.: US 9,747,355 B2
(45) Date of Patent: Aug. 29, 2017

(54) METHOD OF MAKING A HIGH-TEMPERATURE CABLE HAVING A FIBER-REINFORCED REIN LAYER

(71) Applicant: Rockbestos Surprenant Cable Corp., East Granby, CT (US)

(72) Inventors: Daniel D. Masakowski, Westbrook, CT (US); Robert Konnik, South Windsor, CT (US)

(73) Assignee: Rockbestos Surprenant Cable Corp., East Granby, CT (US)

( * ) Notice: Subject to any disclaimer, the term of this patent is extended or adjusted under 35 U.S.C. 154(b) by 289 days.

(21) Appl. No.: 13/708,071

(22) Filed: Dec. 7, 2012

(65) Prior Publication Data

US 2014/0000929 A1    Jan. 2, 2014

(51) Int. Cl.
| | |
|---|---|
| *H01B 13/00* | (2006.01) |
| *G06F 17/30* | (2006.01) |
| *H01B 7/29* | (2006.01) |
| *G06F 9/44* | (2006.01) |
| *H04L 29/08* | (2006.01) |
| *G06F 11/14* | (2006.01) |

(52) U.S. Cl.
CPC ........ *G06F 17/30575* (2013.01); *G06F 9/443* (2013.01); *G06F 9/4443* (2013.01); *G06F 11/1438* (2013.01); *H01B 7/292* (2013.01); *H04L 67/1095* (2013.01); *Y10T 29/49123* (2015.01)

(58) Field of Classification Search
CPC ... H01B 7/292; G06F 11/1438; G06F 9/4443; G06F 17/30575; H04L 67/1095; Y10T 29/4911; Y10T 29/49123; Y10T 29/49194; Y10T 29/492273
USPC ........ 29/825, 33 F, 898.15, 828; 156/53, 55, 156/56; 174/106 R, 121 R, 122 R, 122 C, 174/124 GC, 124 G; 428/375, 383
See application file for complete search history.

(56) References Cited

U.S. PATENT DOCUMENTS

| | | | | |
|---|---|---|---|---|
| 2,539,329 | A * | 1/1951 | Sanders | B05D 7/20 |
| | | | | 29/898.15 |
| 2,691,694 | A * | 10/1954 | Young | H01B 3/445 |
| | | | | 174/121 R |
| 3,980,808 | A | 9/1976 | Kikuchi et al. | |
| 3,983,313 | A | 9/1976 | Ney et al. | |
| 4,514,466 | A * | 4/1985 | Leon et al. | 428/383 |
| 4,598,018 | A * | 7/1986 | Beuscher | H01B 7/292 |
| | | | | 174/124 G |
| 4,626,619 | A * | 12/1986 | Uematsu | 174/106 R |
| 4,681,169 | A | 7/1987 | Brookbank et al. | |
| 5,075,514 | A * | 12/1991 | Hurd | 156/53 |
| 5,126,167 | A | 6/1992 | Matsuno et al. | |
| 5,129,861 | A | 7/1992 | Furukawa et al. | |
| 5,172,765 | A | 12/1992 | Sas-Jaworsky et al. | |
| 5,234,058 | A | 8/1993 | Sas-Jaworsky | |
| 5,274,196 | A * | 12/1993 | Weinberg | H01B 3/084 |
| | | | | 174/121 R |

(Continued)

*Primary Examiner* — Donghai D Nguyen
(74) *Attorney, Agent, or Firm* — Hayes Soloway PC

(57) ABSTRACT

A high-temperature cable and method of making the same is provided. The high-temperature cable includes at least one elongated conductor portion. A fiber-reinforced resin is positioned radially about at least a portion of an exterior surface of the at least one elongated conductor portion. The high-temperature may optionally include a thin metal layer and/or an armor shell.

18 Claims, 5 Drawing Sheets

(56) References Cited

U.S. PATENT DOCUMENTS

| | | |
|---|---|---|
| 5,762,135 A | 6/1998 | Moore |
| 5,857,714 A | 1/1999 | Gustafson |
| 6,016,845 A | 1/2000 | Quigley |
| 6,017,198 A | 1/2000 | Traylor |
| 6,658,186 B1 | 12/2003 | Kristensen et al. |
| 7,024,081 B2 | 4/2006 | Dowd |
| 7,290,601 B2 | 11/2007 | Chalifoux |
| 2006/0151194 A1 | 7/2006 | Varkey |
| 2010/0116541 A1 | 5/2010 | Eshima |

* cited by examiner

METHOD OF MAKING A HIGH-TEMPERATURE CABLE HAVING A FIBER-REINFORCED REIN LAYER

CROSS REFERENCE TO RELATED APPLICATION

This application claims benefit of U.S. Provisional application Ser. No. 61/567,718 entitled, "High-Temperature Cable Having A Fiber-Reinforced Resin Layer" filed Dec. 7, 2011, the entire disclosure of which is incorporated herein by reference.

FIELD OF THE DISCLOSURE

The present disclosure is generally related to cables and more particularly is related to a high-temperature cable having a fiber-reinforced resin layer.

BACKGROUND OF THE DISCLOSURE

Elongated cables are found in use in many industries including those that conduct deep drilling, such as within the oil drilling industry. These cables may be used to transmit information and data from a drilling region having the drilling equipment to a control center located remote to the drilling region. Many oil-drilling regions are located deep within the Earth's crust, such as those seen with onshore and offshore drilling. The drilling region may be 5,000 feet or more from a control center located on the Earth's surface or a control center located on water at sea level. A cable of 5,000 feet or more may have a high weight that, when located vertically down a drilling hole distorts the structure of the cable itself. This may result in a failure of the cable or a deformity of the cable that renders it more inefficient than a non-deformed cable.

It is common for cables used in industries today to be subjected to high-temperature applications, as well as potential damaging situations. For example, cables may be subject to high temperatures from oil drilling operations, equipment, or other devices that may create heat. A metal casing is often used around the cable to help prevent transfer of the heat into the inner components of the cable. This metal casing, for example, may seal off any gassing of the inner materials of the cable, if properly sealed, as well as prevent rocks, sharp objects, or other potentially damaging items from causing harm to the cable. When subjected to heat, many materials will deform or give off volatiles that will lower the insulation resistance of the insulating materials, especially when temperatures exceed 250° C. Materials such as perfluoroalkoxy (PFA) may be used up to temperatures of approximately 250° C., but may be unsuccessful in higher temperature.

Thus, a heretofore unaddressed need exists in the industry to address the aforementioned deficiencies and inadequacies.

SUMMARY OF THE DISCLOSURE

Embodiments of the present disclosure provide a high-temperature cable and related methods. Briefly described, in architecture, one embodiment of the system, among others, can be implemented as follows. The high-temperature cable includes at least one elongated conductor portion. A fiber-reinforced resin is positioned radially about at least a portion of an exterior surface of the at least one elongated conductor portion.

The present disclosure can also be viewed as providing methods of providing a high-temperature cable. In this regard, one embodiment of such a method, among others, can be broadly summarized by the following steps: providing at least one elongated conductor portion; and applying a fiber-reinforced resin radially about an exterior surface of the at least one elongated conductor portion.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
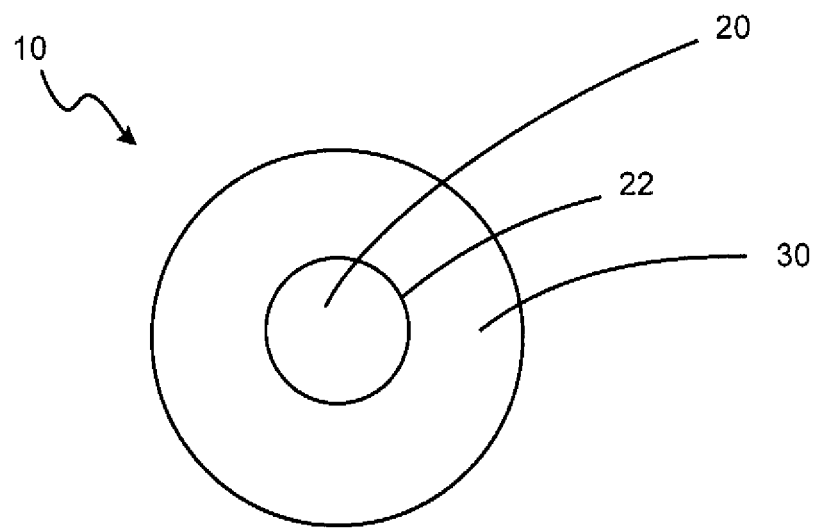
FIG. 1 is a cross-sectional illustration of a high-temperature cable, in accordance with a first exemplary embodiment of the present disclosure.

FIG. 1 is a cross-sectional illustration of a high-temperature cable 10, in accordance with a first exemplary embodiment of the present disclosure. The high-temperature cable 10, which may be referred to simply as 'cable 10,' includes at least one elongated conductor portion 20. A fiber-reinforced resin 30 is positioned radially about at least a portion of an exterior surface 22 of the at least one elongated conductor portion 20.

The cable 10 may be any wire, transmission line or similar structure that may be used in deep drilling operations, such as with onshore or offshore oil drilling. For example, the cable 10 may commonly be used as a sensor cable or an electrical power cable for various operations, including down-hole drilling operations within the fossil fuel industry. The elongated conductor portion 20, which may be referred to herein as 'conductor portion 20' may commonly be a substantially elongated structure having a length dimension that substantially exceeds a width or diameter dimension, as is common with cables and wires. The conductor portion 20 may include any material, which is capable of facilitating movement of electric charges, light or any other communication medium. The conductor portion 20 may include conductor materials such as copper, aluminum, alloys, fiber electric hybrid materials, fiber optical material or any other material known within the industry. The conductor portion 20 may be capable of facilitating movement of energy capable of powering a device or facilitating a communication or control signal between devices. The conductor portion 20 may be located at substantially the center of the cable 10, but may also be located off-center or in another position as well. Any number of conductor portions 20 may be included with the cable 10, configured in any orientation or fashion, such as three conductor portions 20 bound together.

The fiber-reinforced resin 30 may be positioned radially about at least part of the exterior surface 22 of the conductor portion 20. Generally, the fiber-reinforced resin 30 may fully surround the conductor portion 20, with the exception of the ends of the cable 10, which may have exposed conductor portions 20. When the fiber-reinforced resin is radially positioned about the conductor portion 20, the fiber-reinforced resin 30 may be utilized to replace an armor shell, while still providing the necessary protection for the cable 10. However, the fiber-reinforced resin 30 may still be used with an armor shell, as is discussed in other embodiments of this disclosure.

The use of fiber-reinforced resin 30 with the cable 10 may help overcome many of the problems experienced with using cables in high-temperatures, i.e., temperatures at or in excess of 250° C. For example, the fiber-reinforced resin 30 may prove successful for applications between 250° C. and 550° C., but may be particularly successful in temperatures beyond 300° C. The fiber-reinforced resin 30 may include any one, or a variety of resin materials used in combination with reinforcing fibers that are applied over the conductor portion 20. For example, different types of resin materials may be used, each of which may have different sizes or pose different constraints on construction of the cable 10.

The fiber-reinforced resin 30 may be applied to the conductor portion 20 in a number of ways. The fiber-reinforced resin 30 is applied in filaments or tape, such that the fiber-reinforced resin 30 is wrapped around the conductor portion 20. For example, the fiber-reinforced resin 30 may be configured as a braid or other wrapping that is applied to the conductor portion 20 mechanically, such as with a mechanical wrapping apparatus. It may be advantageous to apply the fiber-reinforced resin 30 directly to the exterior surface 22 of the conductor portion 20, or around the conductor portion 20 but not in a direct abutting position.

The fiber-reinforced resin 30 may be manufactured on an assembling line with any type of machine or apparatus wrapping or otherwise applying the fiber-reinforced resin 30 about the conductor portion 20. For example, the fiber-reinforced resin 30 may be produced by an extrusion or pultrusion process. In the pultrusion process, reinforcing fibers may be pulled through a quantity of resin to form the fiber-reinforced resin 30. When the reinforcing fibers are combined with the resin, they may optionally be subjected to a heated die, or a polymerization process. All configurations and designs of the use of fiber-reinforced resin 30 applied to the conductor portion 20 are considered within the scope of the present disclosure.

In operation, the cable 10 may be placed vertically, wherein one end of the cable 10 is substantially above the other end of the cable 10. This may include a cable 10 with any length, such as 100 feet, 300 feet, 500 feet or greater, or any other length. For example, the cable 10 may be suspended within a hole drilled within the Earth's crust, wherein one end of the cable 10 is located above the Earth's crust and the other end is located 500 feet or more below the Earth's crust. The cable 10 may be held in this position for any period of time. As the cable 10 is used, the fiber-reinforced resin 30 may shield the conductor portion 20 from thermal damage from high environmental temperatures, such as heat from work conditions, tools, or other sources of heat. For example, friction from a drilling operation may create a substantial amount of heat that may be transferred through the environment, e.g., water or air, to the cable 10. The fiber-reinforced resin 30 may shield the conductor portion 20 from damage that may normally occur with conventional cables. As one having ordinary skill in the art would recognize, many variations, configuration and designs may be included with the cable 10, or any component thereof, all of which are considered within the scope of the disclosure.

Figure 2:
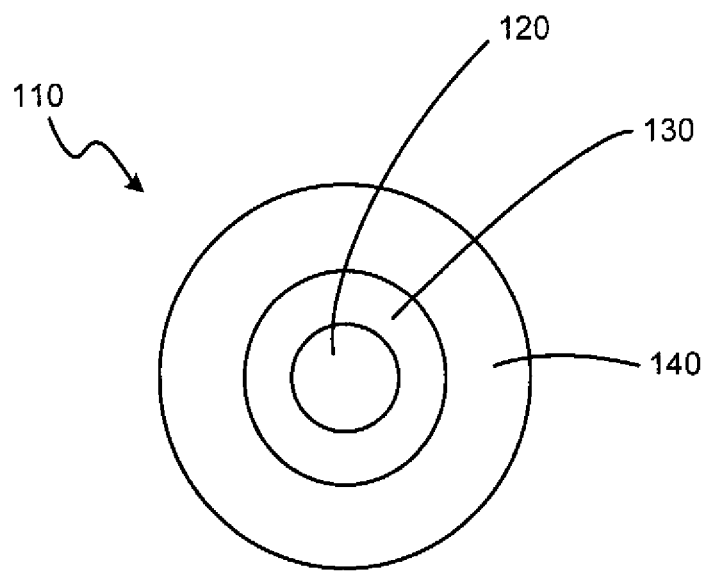
FIG. 2 is a cross-sectional illustration of a high-temperature cable, in accordance with a second exemplary embodiment of the present disclosure.

FIG. 2 is a cross-sectional illustration of a high-temperature cable 110, in accordance with a second exemplary embodiment of the present disclosure. The high-temperature cable 110, which may be referred to simply as 'cable 110,' may be substantially similar to the cable 10 of the first exemplary embodiment, and may include any of the features, components, or functions described with respect to any of the exemplary embodiments of this disclosure. The cable 110 includes a conductor portion 120 and a fiber-reinforced resin 130 wrapped around the conductor portion 120. An armor shell 140 may be applied to the exterior of the fiber-reinforced resin 130. The second exemplary embodiment, as shown in FIG. 2, includes an armor shell 140 applied to the exterior of the fiber-reinforced resin 130, however the armor shell 140 may also be applied in an indirect position over the fiber-reinforced resin 130.

The armor shell 140 is a sheath or exterior coating or layer that is applied to an exterior surface of the fiber-reinforced resin 130 and protects the inner components of the cable 110. Any material, substance or layer located on the exterior of the cable 110 and capable of protecting the cable 110 may be considered an armor shell 140. The armor shell 140 may be substantially concentric to the conductor portion 120 and constructed from a strong material, such as a stainless steel or Incoloy. The armor shell 140 may protect the cable 110 from foreign objects penetrating the cable 110, such as debris from a drilling process. The armor shell 140 may also support the cable 110 to an anchoring position or between two anchoring positions. For example, the cable 110 may be anchored on one end with the armor shell 140 whereby the other end of the cable 110 is located in a vertical direction within the Earth, such as when it is placed down a drilling hole. The armor shell 140 may also include any woven, solid, particulate-based and layered protecting materials. In some instances, such as illustrated in FIG. 2, the fiber-reinforced resin 130 may be the only material between the conductor portion 120 and the armor shell 140. However, other materials and layers of materials may also be used with the cable 110, as described with respect to FIG. 2.

Figure 3:
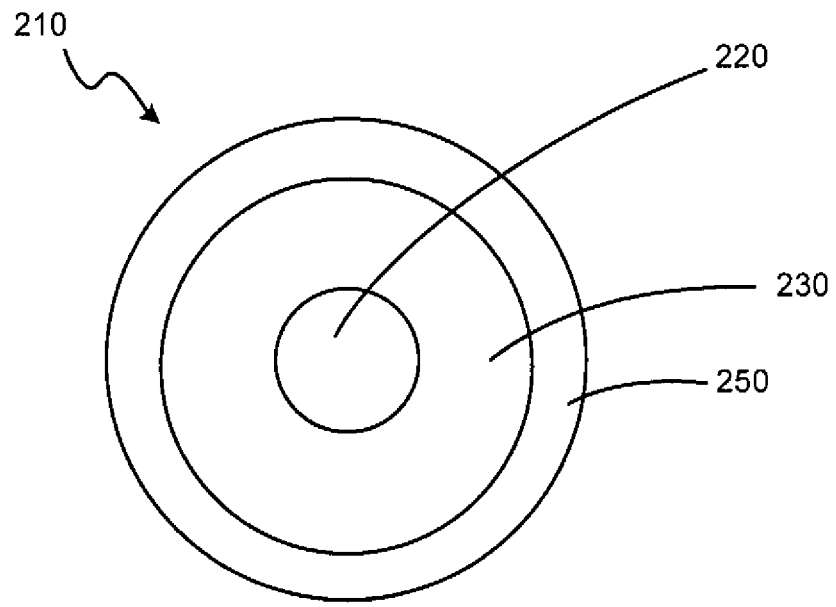
FIG. 3 is a cross-sectional illustration of a high-temperature cable, in accordance with a third exemplary embodiment of the present disclosure.
Figure 4:
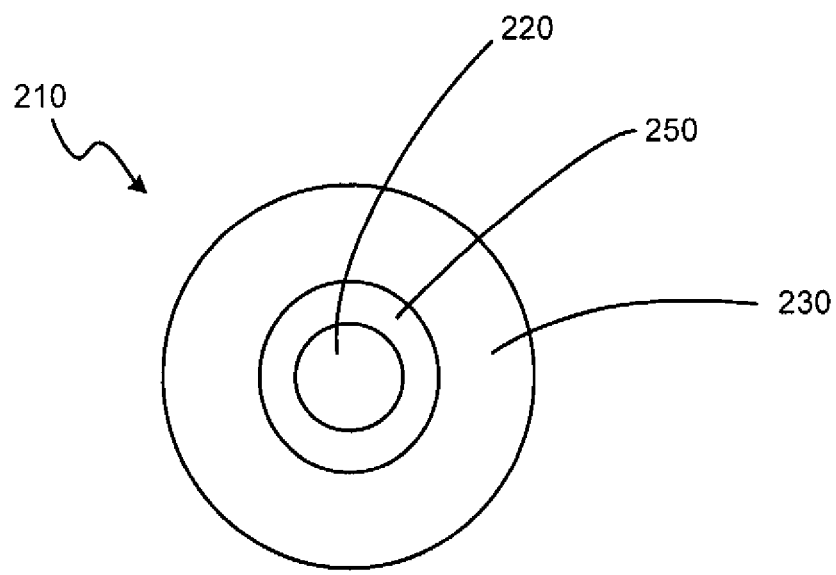
FIG. 4 is a cross-sectional illustration of a high-temperature cable, in accordance with the third exemplary embodiment of the present disclosure.

FIG. 3 is a cross-sectional illustration of a high-temperature cable 210, in accordance with a third embodiment of the present disclosure. The high-temperature cable 210, which may be referred to simply as 'cable 210,' is substantially similar to the cable 10 of the first exemplary embodiment, as shown in FIG. 1 and the cable 110 of the second exemplary embodiment, as shown in FIG. 2, and described with respect thereto. Accordingly, the cable 210 may include any of the features, components, or functions described with respect to any of the exemplary embodiments of this disclosure. The cable 210 includes a conductor portion 220. A fiber-reinforced resin 230 is wrapped around the conductor portion 220. An armor shell (not shown) may optionally be applied to the exterior of the fiber-reinforced resin 230. A thin metal layer 250 constructed from any type of metallic material may be placed either exterior to the fiber-reinforced resin 230 or interior to the fiber-reinforced resin 230 (FIG. 4). In FIG. 3, the metal layer 250 is positioned exterior to the fiber-reinforced layer 230.

In combination with the fiber-reinforcing resin 230, the thin metal layer 250 may be used to provide additional protection to the inner materials of the cable 110, such as in regards to permeation issues. The thin metal layer 250 may be applied with any method, such as by welding or by the application of a flat tape that is applied longitudinally on the cable 210. The metal layer 250 may be smooth, corrugated, or have any other shape or design, including any type of textured surface. The thin metal layer 250 may also be bonded or unbonded, as needed. The use of the metal layer 250 may make the cable 210 lighter and easier to manipulate when in use, as compared to a more bulky and cumbersome armor shell, while still providing the needed rigidity and mechanical protection.

FIG. 4 is a cross-sectional illustration of a high-temperature cable 210, in accordance with the third embodiment of the present disclosure. The cable 210 of FIG. 4 shows the metal layer 250 applied to the interior of the fiber-reinforced layer 230. As can be see, metal layer 250 is positioned between the conductor portion 220 and the fiber-reinforced layer 230, as compared to the thin metal layer 250 depicted in FIG. 3 wherein the thin metal layer 250 is positioned exterior of the fiber-reinforcing resin 230. It is noted that the thin metal layer 250 of FIGS. 3-4 is not illustrated to scale, but is enlarged for clarity of the disclosure.

It is noted that the cable 210, or the cables described with respect to any exemplary embodiment of this disclosure, may include any shape, such as a circular cross-sectional shape, a square cross-sectional shape, or any other cross-sectional shape. The cable 210 may also include dimensions that make it convenient for use with existing products, such as existing attachment methods that use ferrules. The attachment pieces used with the cable 210 may be different shapes from the cable 210 itself, and may be used to keep the cable 210 oriented. The attachment pieces may be continuous or intermittent for termination purposes. The cable 210 may have an equivalent chemical resistance to cables conventionally used, including resistance to $H_2S$ and oil, as well as resistance to high pressure in excess of 40,000 PSI and high temperatures in excess of 300° C.

Figure 5:
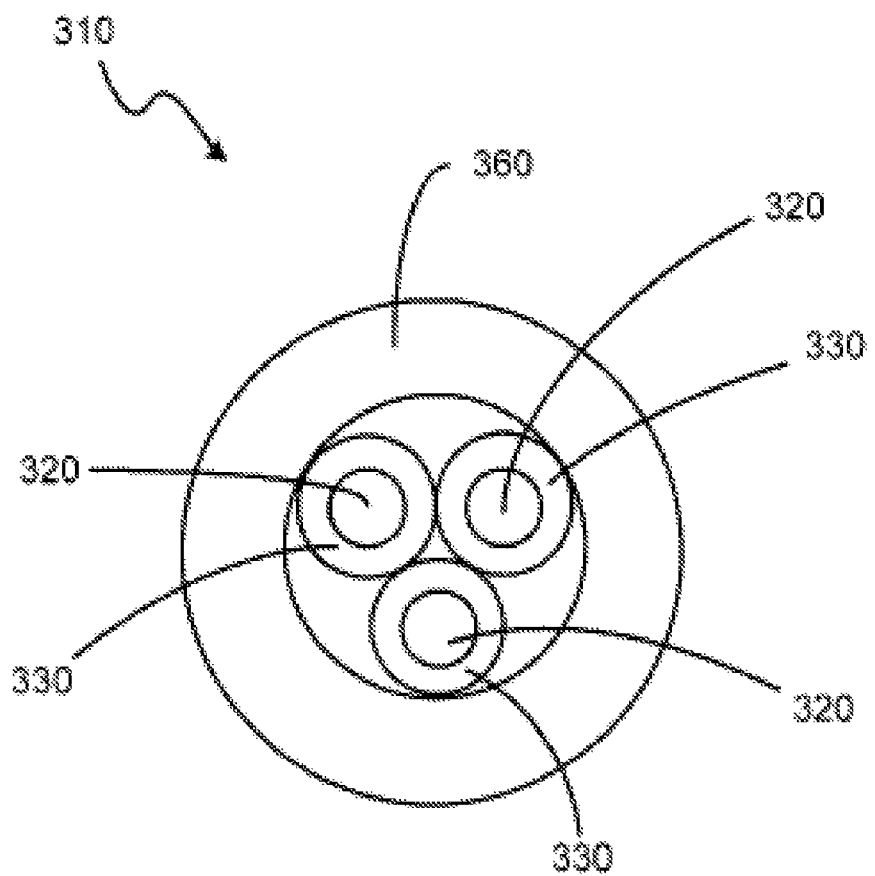
FIG. 5 is a cross-sectional illustration of a high-temperature cable, in accordance with a fourth exemplary embodiment of the present disclosure.

FIG. 5 is a cross-sectional illustration of a high-temperature cable 310, in accordance with a fourth exemplary embodiment of the present disclosure. The high-temperature cable 310, which may be referred to simply as 'cable 310,' is substantially similar to the cable described within the other exemplary embodiments of this disclosure. Accordingly, the cable 310 may include any of the features, components, or functions described with respect to any of the exemplary embodiments of this disclosure. The cable 310 includes a plurality of conductor portions 320. A fiber-reinforced resin 330 is wrapped around each of the plurality of conductor portions 320. An exterior metallic layer 360, which may be substantially similar to the armor shell described with respect to FIG. 2 or the thin metal layer described with respect to FIGS. 3-4, may be positioned exterior of the fiber-reinforced resin 330.

The plurality of conductor portions 320 may include any number of solid, fibrous, or other conductor materials. The plurality of conductor portions 320 may facilitate the transmission of electrical energy through the cable 310, or may facilitate communication of control signals through the cable 310. The fiber-reinforced resin 330 may be applied to any number of conductor portions 320 in any configuration, such as individually to each conductor portion 320, or to a bundle or grouping of conductor portions 320. The plurality of conductor portions 320 may facilitate transmission of varying signals, such as communication signals on one of the plurality of conductor portions 320 and energy transmission on another of the plurality of conductor portions 320. As one having ordinary skill in the art would recognize, many variations, configurations and, designs may be included with the cable 310, or any component thereof, all of which are considered within the scope of the disclosure.

Figure 6:
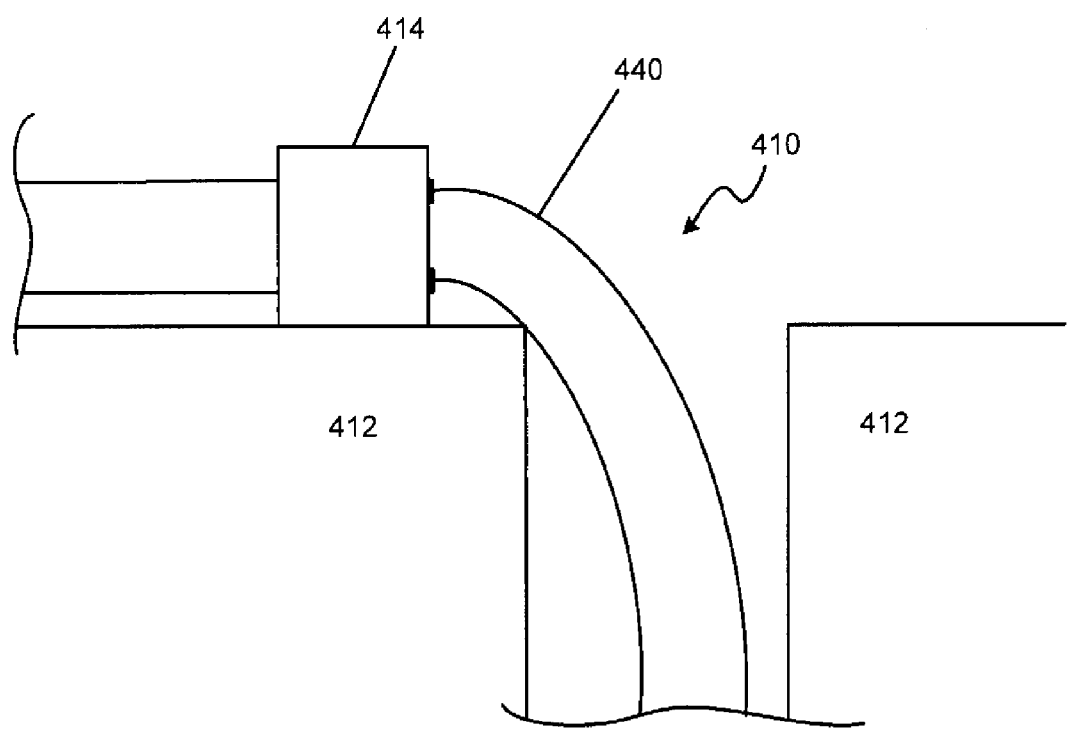
FIG. 6 is a plan view illustration of a high-temperature cable in an installed position, in accordance with a fifth exemplary embodiment of the present disclosure.

FIG. 6 is a plan view illustration of a high-temperature cable 410 in an installed position, in accordance with a fifth exemplary embodiment of the present disclosure. The high-temperature cable 410, which may be referred to simply as 'cable 410,' is substantially similar the cables described in the other embodiments of this disclosure, and may include any of the features discussed relative to those embodiments. Although not shown, the cable 410 includes at least one conductor portion and a fiber-reinforcing layer position exterior of the at least one conductor portion. An armor shell 440 is applied exterior of the fiber-reinforcing layer. The armor shell 440 may be used to support the cable 410 to a supporting structure 414, such as an anchoring post or other anchoring structure. With one end of the cable 410 anchored to the supporting structure 414, the cable 410 may be positioned substantially vertically within the Earth 412. For example, this use of the cable 410 may be commonly seen when the cable 410 is used with down-hole drilling operations. Anchoring the armor shell 440 to the supporting structure 414 may allow for the weight of the cable 410 to be properly supported without damaging the inner components of the cable 410.

Figure 7:
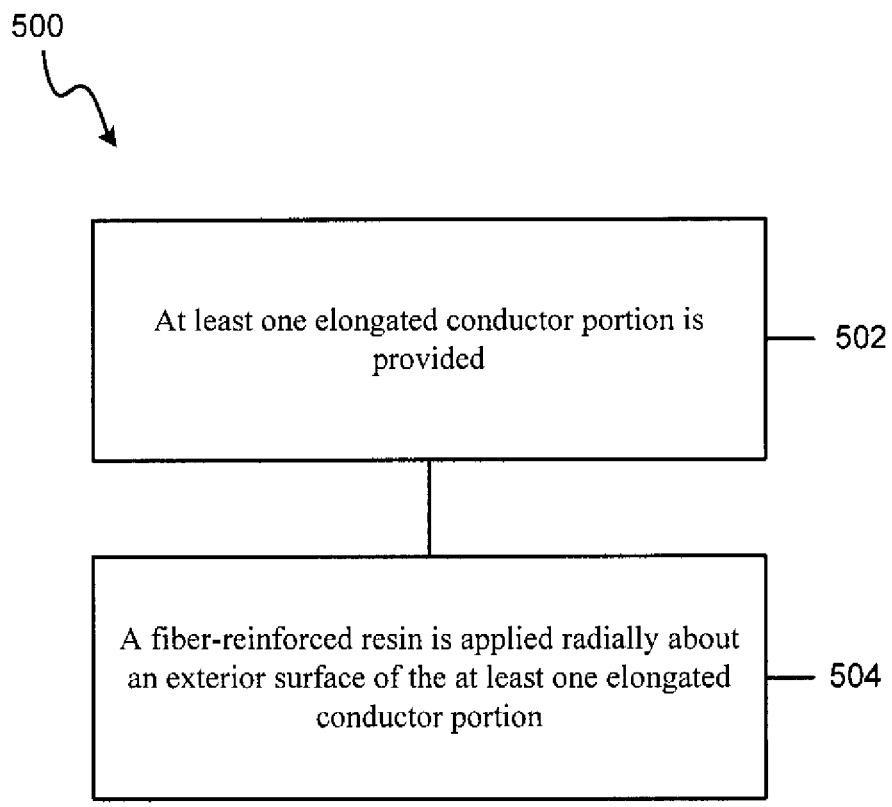
FIG. 7 is a flowchart illustrating a method of providing a high-temperature cable, in accordance with the first exemplary embodiment of the disclosure

FIG. 7 is a flowchart 500 illustrating a method of providing a high-temperature cable 10, in accordance with the first exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 502, at least one elongated conductor portion is provided. A fiber-reinforced resin is applied radially about an exterior surface of the at least one elongated conductor portion (block 504). Additionally, the method may include any of the steps, processes, or functions described with respect to FIGS. 1-6. For example, the method may include positioning a thin metal layer radially about at least a portion of an exterior surface of the fiber-reinforced resin. In one alternative, the thin metal layer may be positioned radially about at least a portion of the exterior surface of the at least one elongated conductor portion, but interior of the fiber-reinforced resin. An armor shell may be positioned over the exterior of the fiber-reinforced resin.

The process of applying the fiber-reinforced resin may include a number of different techniques or variations. For example, the fiber-reinforced resin may be applied by wrapping it about the at least one elongated conductor portion. Wrapping the fiber-reinforced resin may include first applying a plurality of reinforcing fibers about the at least one elongated conductor portion. A viscous resin may then be applied to the plurality of reinforcing fibers and the resin may be cured on the conductor portion. When a plurality of elongated conductor portions are utilized, the fiber-reinforced resin may be applied radially about the exterior surface of each of the plurality of elongated conductor portions.

The fiber-reinforced resin may be formed in a pultrusion process, where a plurality of reinforcing fibers are pulled through at least one resin material, and then the fiber-reinforced resin is mechanically wrapped about the at least one elongated conductor portion. In a similar manner, the fiber-reinforced resin may be formed with an extrusion process, wherein a plurality of reinforcing fibers are combined with at least one resin material, and then the combined plurality of reinforcing fibers and at least one resin material are extruded through at least one die.

After the fiber-reinforced resin is properly applied as part of the high-temperature cable, the high-temperature cable, i.e., at least the fiber-reinforced resin and the at least one elongated conductor portion, may be subjected to an exterior temperature source greater than 300° C. The fiber-reinforced resin, alone or in combination with other components of the high-temperature cable, may protect the elongated conductor portion from the exterior temperature source.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A method of providing a high-temperature cable, the method comprising:
   providing at least one elongated conductor portion;
   applying a fiber-reinforced resin radially about an exterior surface of the at least one elongated conductor portion by:
      combining a plurality of reinforcing fibers with an uncured resin material;
      after combining the plurality of reinforcing fibers with the uncured resin material, wrapping the combined plurality of reinforcing fibers and uncured resin material about the at least one elongated conductor portion; and
      after wrapping the combined plurality of reinforcing fibers and uncured resin material about the at least one elongated conductor portion, curing the combined plurality of reinforcing fibers and uncured resin material on the at least one elongated conductor portion; and positioning a thin metal layer radially about at least one of: at least a portion of an exterior surface of the fiber-reinforced resin; and at least a portion of the exterior surface of the at least one elongated conductor portion and interior of the fiber-reinforced resin, wherein the thin metal layer is corrugated.

2. The method of claim 1, wherein combining the plurality of reinforcing fibers with the uncured resin material comprises:
   inserting the plurality of reinforcing fibers into the uncured resin material to form the fiber-reinforced resin.

3. The method of claim 1, wherein in applying the fiber-reinforced resin radially about the exterior surface of the at least one elongated conductor portion, after combining the plurality of reinforcing fibers with the uncured resin material, wrapping the combined plurality of reinforcing fibers and uncured resin material about the at least one elongated conductor portion comprises a mechanical wrapping process.

4. The method of claim 1, wherein combining the plurality of reinforcing fibers with the uncured resin material comprises a pultrusion process, wherein the plurality of reinforcing fibers are pulled through the uncured resin material.

5. The method of claim 1, wherein combining the plurality of reinforcing fibers with the uncured resin material comprises an extrusion process, wherein the combined plurality of reinforcing fibers and the uncured resin material are extruded through at least one die.

6. The method of claim 5, wherein the at least one die is heated.

7. The method of claim 1, wherein:
   the at least one elongated conductor portion comprises a plurality of elongated conductor portions; and
   in applying the fiber-reinforced resin radially about the exterior surface of the at least one elongated conductor portion, after combining the plurality of reinforcing fibers with the uncured resin material, wrapping the combined plurality of reinforcing fibers and uncured resin material about the at least one elongated conductor portion comprises:
   wrapping the fiber-reinforced resin radially about an exterior surface of each of the plurality of elongated conductor portions.

8. The method of claim 1, further comprising:
   subjecting the fiber-reinforced resin and the at least one elongated conductor portion to an exterior temperature source greater than 300° C.; and
   protecting the at least one elongated conductor portion from the exterior temperature source.

9. The method of claim 1, wherein the fiber-reinforced resin is in direct contact with the exterior surface of the at least one elongated conductor portion.

10. The method of claim 1, wherein the fiber-reinforced resin is braided.

11. The method of claim 1, wherein after applying the fiber-reinforced resin radially about the exterior surface of the at least one elongated conductor portion, the method further comprises:
    subjecting the fiber-reinforced resin to a polymerization process.

12. The method of claim 1, wherein positioning the thin metal layer comprises a welding process.

13. The method of claim 1, wherein in positioning the thin metal layer, the thin metal layer is disposed longitudinally on either:
    the at least a portion of the exterior surface of the fiber-reinforced resin; and
    the at least a portion of the exterior surface of the at least one elongated conductor portion.

14. The method of claim 1, further comprising:
positioning an armor shell exterior of the fiber-reinforced resin, wherein the armor shell is woven and comprises at least one of stainless steel and Incoloy.

15. The method of claim 1, further comprising:
positioning an armor shell exterior of the fiber-reinforced resin, wherein the armor shell is particulate-based and comprises at least one of stainless steel and Incoloy.

16. The method of claim 1, further comprising:
positioning an armor shell exterior of the fiber-reinforced resin, wherein the armor shell is layered and comprises at least one of stainless steel and Incoloy.

17. A method of providing a high-temperature cable, the method comprising:
providing a plurality of elongated conductor portions;
applying a fiber-reinforced resin radially about an exterior surface of each of the plurality of elongated conductor portions by:
combining a plurality of reinforcing fibers with an uncured resin material;
after combining the plurality of reinforcing fibers with the uncured resin material, wrapping the combined plurality of reinforcing fibers and uncured resin material about the exterior surface of each of the plurality of elongated conductor portions; and
curing the combined plurality of reinforcing fibers and uncured resin material on each of the plurality of elongated conductor portions; and
positioning an exterior metal layer radially about all of the plurality of elongated conductor portions; and positioning a thin metal layer radially about at least one of: at least a portion of an exterior surface of the fiber-reinforced resin; and at least a portion of the exterior surface of the at least one elongated conductor portion and interior of the fiber-reinforced resin, wherein the thin metal layer is corrugated.

18. The method of claim 17, wherein the fiber-reinforced resin is in direct contact with the exterior surface of at least one of the at least one elongated conductor portion.

* * * * *

UNITED STATES PATENT AND TRADEMARK OFFICE
CERTIFICATE OF CORRECTION

PATENT NO. : 9,747,355 B2  
APPLICATION NO. : 13/708071  
DATED : August 29, 2017  
INVENTOR(S) : Masakowski et al.

Page 1 of 1

It is certified that error appears in the above-identified patent and that said Letters Patent is hereby corrected as shown below:

In the title, "Rein" should be --Resin--.

Signed and Sealed this
Twenty-fourth Day of April, 2018

Andrei Iancu
*Director of the United States Patent and Trademark Office*